United States Patent [19]

Townsend

[11] 4,142,000
[45] Feb. 27, 1979

[54] METHOD AND MEANS FOR INJECTING FLUIDS INTO MEAT PRODUCTS

[75] Inventor: Ray T. Townsend, Des Moines, Iowa

[73] Assignee: Townsend Engineering Company, Des Moines, Iowa

[21] Appl. No.: 789,017

[22] Filed: Apr. 20, 1977

[51] Int. Cl.$^2$ ............................................. A23L 1/31
[52] U.S. Cl. ................................. 426/281; 99/533; 99/535
[58] Field of Search .................. 99/532, 533, 535, 576; 426/58, 281, 332

[56] References Cited

U.S. PATENT DOCUMENTS

| | | | |
|---|---|---|---|
| 3,381,603 | 5/1968 | Jensen | 99/533 |
| 3,687,058 | 2/1970 | Townsend | 99/533 |
| 3,863,556 | 2/1975 | Townsend | 99/533 |
| 3,919,931 | 11/1975 | Liljenberg | 99/533 |

Primary Examiner—Christopher K. Moore
Attorney, Agent, or Firm—Zarley, Mckee, Thomte, Voorhees & Sease

[57] ABSTRACT

A machine for injecting fluids into meat products or the like comprising a table having a conveyor mounted thereon adapted to convey the meat product from one end to the other. A pair of reciprocating arms are pivotally connected at one end thereof to opposite sides of the table. An electric motor is operatively connected to the reciprocating arms to move the reciprocating arms upwardly and downwardly with respect to the conveyor. A fluid manifold apparatus comprised of a plurality of fluid manifolds is rigidly secured to the other ends of the reciprocating arms and extends therebetween across the table transversely to the direction of travel of the meat product. Each of the manifolds has a plurality of injector needles extending downwardly therefrom which are adapted to pierce the product and inject fluid thereinto while the needles are embedded within the product. Each of the fluid manifolds is in operative communication with a displacement pump which is in communication with the source of fluid to be injected. A stripper plate is secured to each of the fluid manifolds and moves vertically downwardly with the fluid manifold until it engages the product to sense the thickness of the product. The fluid manifold continues to move downwardly or overtravels with respect to the stripper plate after the stripper plate engages the meat product. An actuator arm is pivotally connected to each of the stripper plates to actuate a valve imposed between the displacement pump and the fluid manifold during the overtravel movement. Each of the displacement pumps includes a movable piston which is operatively connected to a cam mounted on the shaft which imparts the reciprocable movement of the reciprocating arms so that the displacement pump is actuated to coincide with the vertical velocity or harmonic motion of the fluid manifold.

18 Claims, 12 Drawing Figures

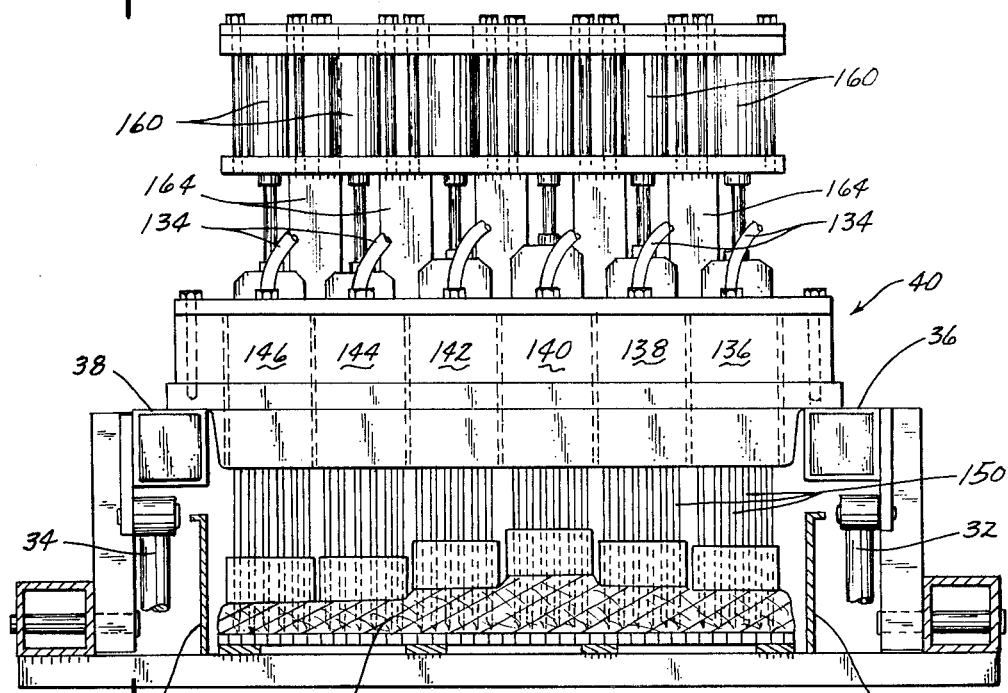
Fig. 3
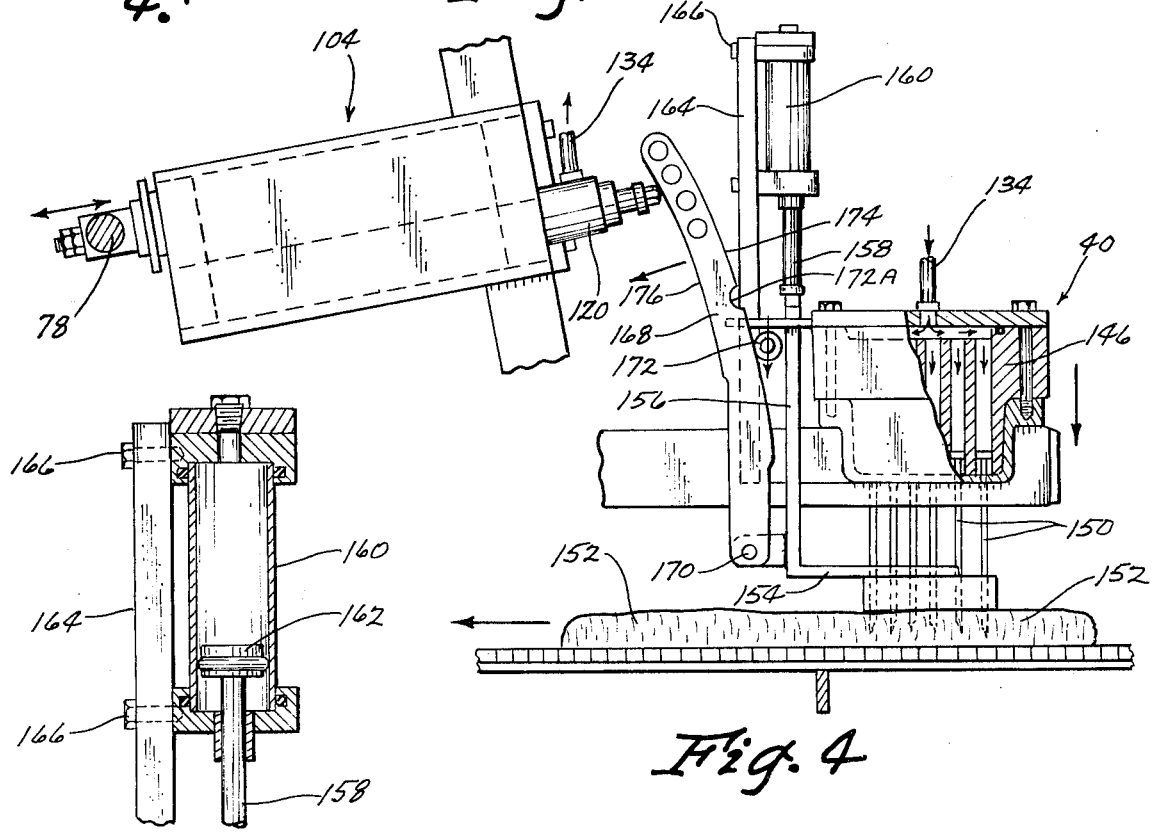
Fig. 4
Fig. 5

METHOD AND MEANS FOR INJECTING FLUIDS INTO MEAT PRODUCTS

BACKGROUND OF THE INVENTION

At the present time, the generally accepted method of curing bellies and other meat products is to inject the product, through a series of needles, with a pickle or curing solution, and then curing the product in a smokehouse. It is extremely desirable that a controlled amount of fluid be injected into the product, and the desired amount or percentage will vary according to several factors.

In applicant's earlier device disclosed in U.S. Pat. No. 3,863,556, a machine was disclosed for injecting fluid into the meat products which attempted to sense the thickness of the products and to inject a corresponding amount of injector fluid thereinto. In the injector of said patent, the amount of injection is determined by the length of time the control valve is open and the time that the control valve is open is determined by the thickness of the belly or product. In applicant's earlier device a stripper bar moves downwardly and rests on the surface of the product, and the average height of the stripper bar determines the amount of time that the flow valve is open. A cam arrangement was used in applicant's earlier device to control the valve opening time as desired based on the thickness of the belly and also on other factors such as the bleed characteristic of a thick belly as compared to a thin belly. As stated, the amount of injection in applicant's earlier machine is dependent on the time that the flow valve is open. This time factor will not vary in exact proportion to the thickness of the belly because of the crank action which moves the fluid manifold and needles upwardly and downwardly. In other words, when a crank is at the bottom of its stroke, the needles would be in a half-inch of belly much longer than they would be in a half-inch of belly at the middle of the stroke. Therefore, the timing of the valve opening becomes a complicated matter and the control cam becomes extremely difficult to establish.

It is impractical to move the needles at a constant velocity into a meat product. Thus, it is common in the art to utilize a cam or crank whereby the needles are moved into and out of the meat product with a crank action. This means that the velocity of the needles varies throughout the penetration and retraction strokes. The velocity of the needles starts from zero at the top of the penetration stroke, moves to maximum velocity halfway through the penetration stroke, and slows to zero velocity as maximum penetration is reached, and the retraction stroke commences. The retraction stroke duplicates the velocity curve of the penetration stroke.

Since the velocity of a crank-activated gang of needles varies, a continuous fluid supply pump will provide a varying amount of fluid in different stratas of the meat product. The stratas through which the needles most quickly pass will receive the least fluid, and the stratas through which the needles more slowly pass will receive more fluid. This violates the ultimate objective of uniformly distributing the fluid through the thickness of the meat product. The device and method of this invention overcome this problem by varying the amount of fluid delivered through the needles in proportion to the varying velocity of the needles as they move into and out of the meat product.

Therefore, it is a principal object of the invention to provide an improved machine and method for injecting fluids into meat products wherein the flow of fluid through the injection needles is at a rate proportional to the velocity of the needles.

A still further object of the invention is to provide an injector machine employing displacement pumps which are driven from the same crank which drives the fluid manifold upwardly and downwardly or at least from another means which moves in conjunction with the fluid manifold.

A still further object of the invention is to provide a machine for injecting fluid into meat products wherein a stripper plate senses the surface of the meat product and the stripper plate controls the displacement of a displacement pump in accordance with the thickness of the meat product.

A still further object of the invention is to provide a machine for injecting fluid into meat products or the like which has eliminated the need for controlling the time that the flow valve is open.

A still further object of the invention is to provide a machine for injecting fluid into meat products or the like which is economical to manufacture and durable in use.

SUMMARY OF THE INVENTION

A machine for injecting fluids into meat products or the like is disclosed comprising a table having a conveyor means mounted thereon which is adapted to move the meat product from one end thereof towards the other end thereof. A fluid manifold means comprised of a plurality of fluid manifolds are mounted on the ends of reciprocating arms pivotally connected to the table so that the injector needles of the fluid manifolds will be moved upwardly and downwardly relative to the meat product upon the reciprocating arms being reciprocated. A displacement pump is in fluid communication, through a valve, to each of the fluid manifolds to supply injection fluid thereto upon the associated control valve being opened. Each of the displacement pumps is in fluid communication with the source of injection fluid. A stripper plate assembly is mounted on each of the fluid manifolds and moves downwardly with the fluid manifold until the stripper plate engages the upper surface of the meat product. After the sensing plate has engaged the meat product, the fluid manifold continues to move downwardly relative thereto so that the needles pierce the meat. The continued movement or overtravel of the fluid manifold causes a valve actuator mounted on the stripper plate to open the associated control valve so that the associated displacement pump will supply fluid to the fluid manifold. Each of the displacement pumps is controlled by means of a cam linkage which is driven from the same crank which drives the fluid manifold upwardly and downwardly. The rate of flow of fluid through the needles is coordinated with the velocity of the needles as they penetrate and withdraw from the meat product.

BRIEF DESCRIPTION OF THE DRAWINGS

FIG. 3 is an enlarged sectional view seen on lines 3—3 of FIG. 2:

FIG. 4 is a sectional view seen on lines 4—4 of FIG. 3:

FIG. 5 is a sectional view of a portion of the structure for mounting each of the stripper plates:

DESCRIPTION OF THE PREFERRED EMBODIMENT

Figure 1:
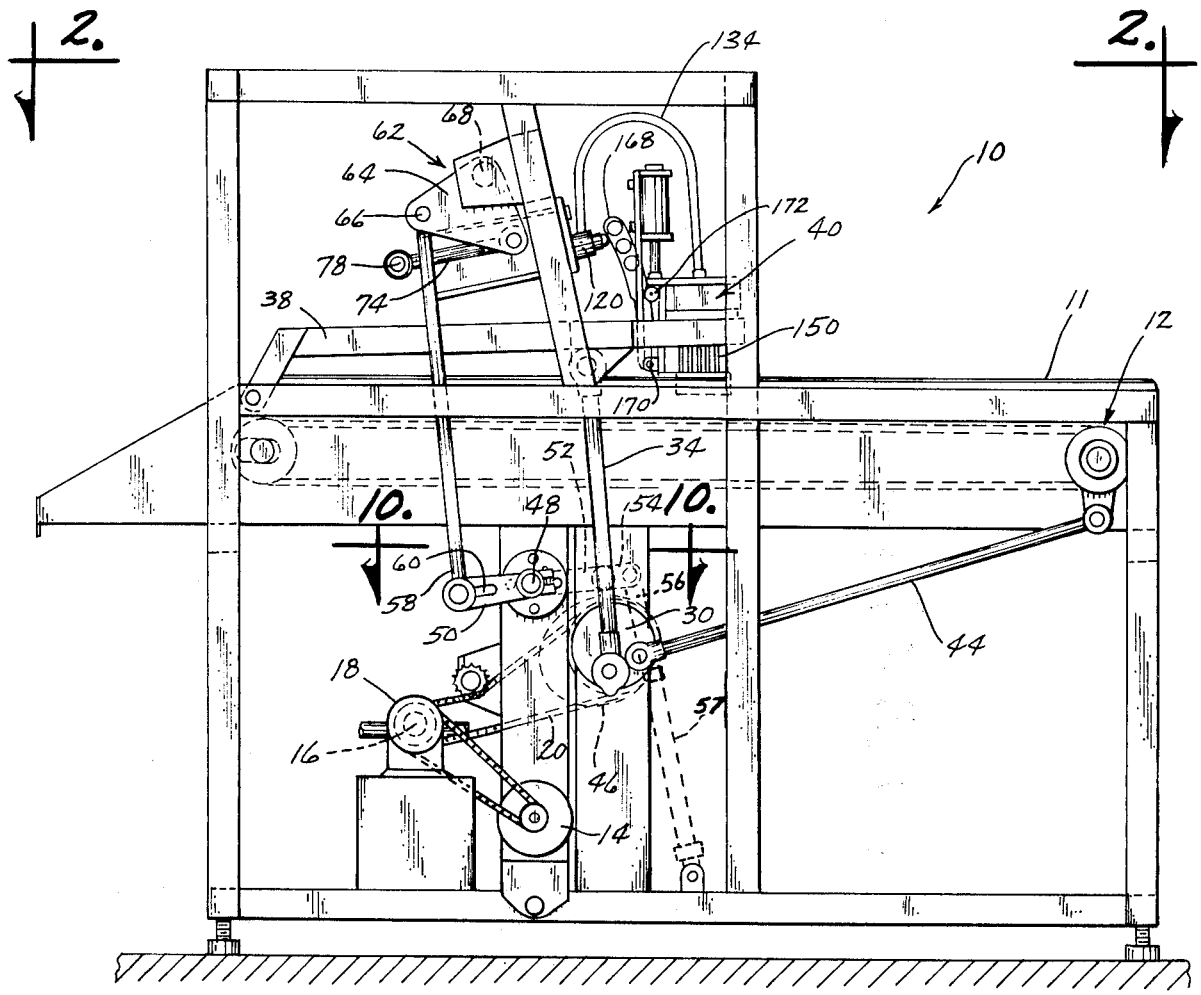
FIG. 1 is a side elevational view of the machine of this invention.
Figure 2:
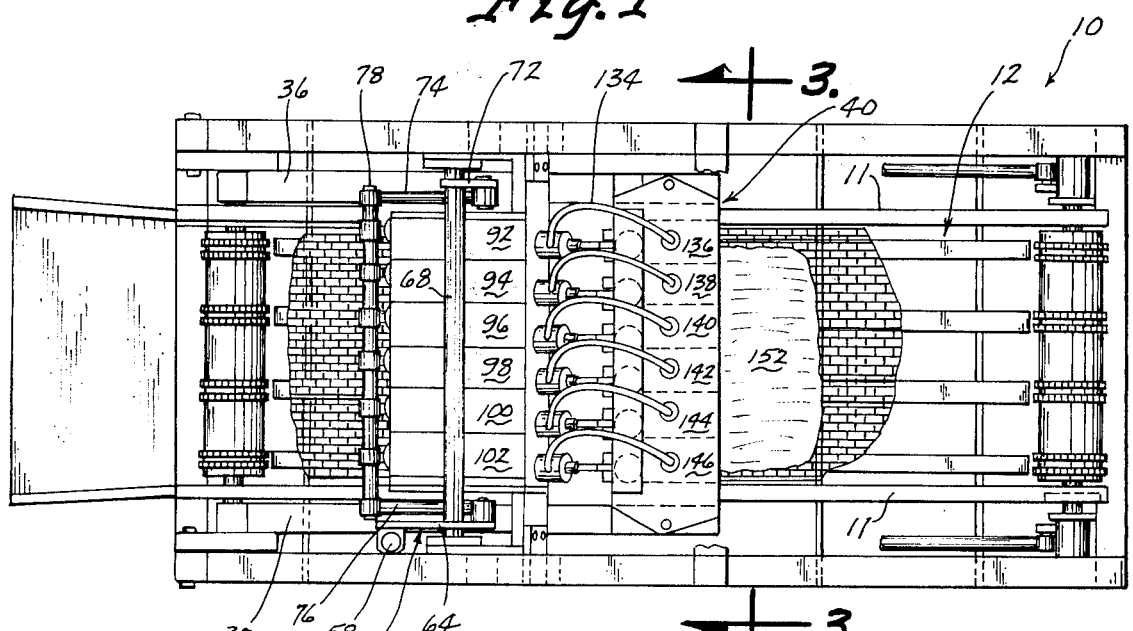
FIG. 2 is a view of the machine as seen on lines 2—2 of FIG. 1.

The injector machine of this invention is generally designated by the reference numeral 10 and is substantially identical to the injector machine 10 disclosed in U.S. Pat. No. 3,687,058 and substantially identical to the injector machine 10 disclosed in U.S. Pat. No. 3,863,556 and hence will not be described in detail with reliance being made on the disclosure of said patents to complete this disclosure.

Machine 10 generally comprises a table 11 having a conveyor means 12 provided thereon for conveying the meat product from right to left as viewed in FIG. 1.

Figure 12:
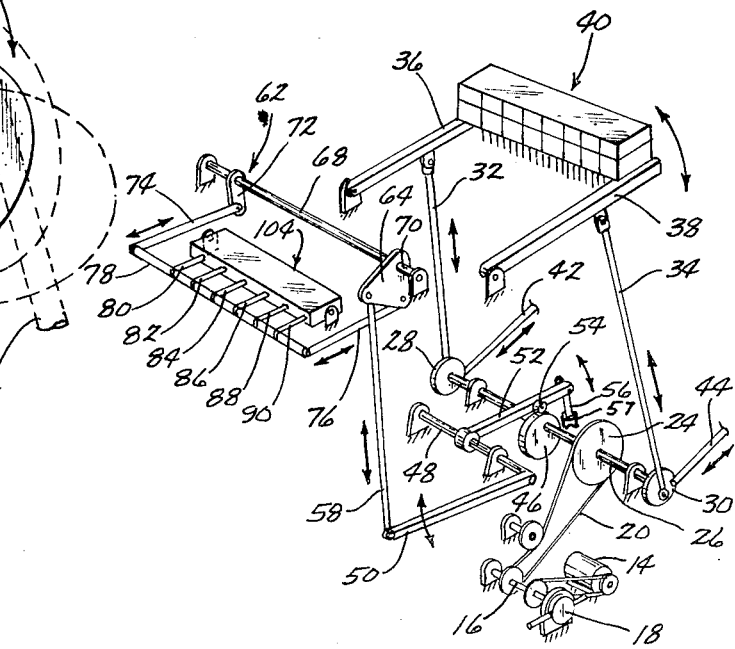
FIG. 12 is a perspective schematic of the means for controlling the fluid manifold and displacement pump assemblies.

The numeral 14 refers to a power means having a power shaft 16 extending therefrom which operates a fluid pump 18 and which has a chain 20 extending therefrom to a sprocket 24 mounted on shaft 26 which is rotatably mounted on the machine 10. Shaft 26 is provided with eccentrics 28 and 30 at its opposite ends. Reciprocal arms 32 and 34 are connected to the eccentrics 28 and 30 respectively and have their upper ends pivotally connected to fluid manifold support arms 36 and 38 which have one end thereof pivotally connected to the machine as illustrated in the drawings. A fluid manifold means 40 is mounted on the free ends of the arms 36 and 38 as illustrated in FIG. 12 and will be described in more detail hereinafter. Rods 42 and 44 are also connected to the eccentrics 28 and 30 in conventional fashion and are operatively connected to the conveyor means 12 for driving the same.

Figure 11:
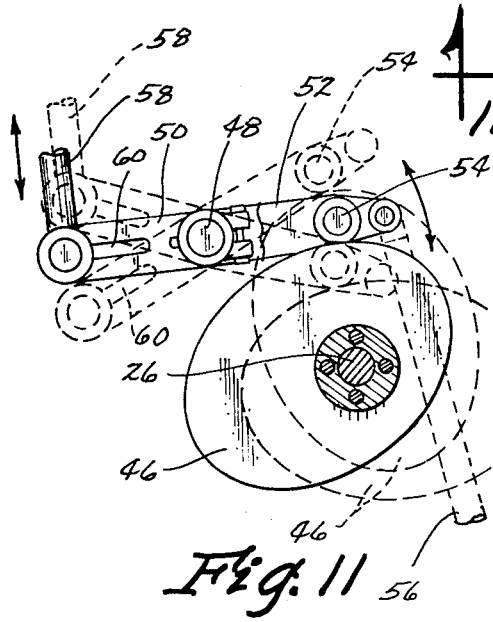
FIG. 11 is a sectional view seen on lines 11—11 of FIG. 10.

Cam 46 is mounted on shaft 26 as illustrated in FIGS. 11 and 12. Shaft 48 is rotatably mounted on machine 10 and has a crank arm 50 secured to one end thereof and a crank arm 52 secured thereto intermediate the lengths thereof. Cam roller 54 is secured to crank arm 52 and is in engagement with the cam surface of cam 46. Rod 56 is pivotally connected to one end of crank arm 52 and extends downwardly therefrom and is mounted in an air or spring type shock absorber referred to generally by the reference numeral 57 which yieldably urges the crank arm 52 downwardly so that the roller 54 is maintained in engagement with the cam surface of cam 46.

Figure 6:
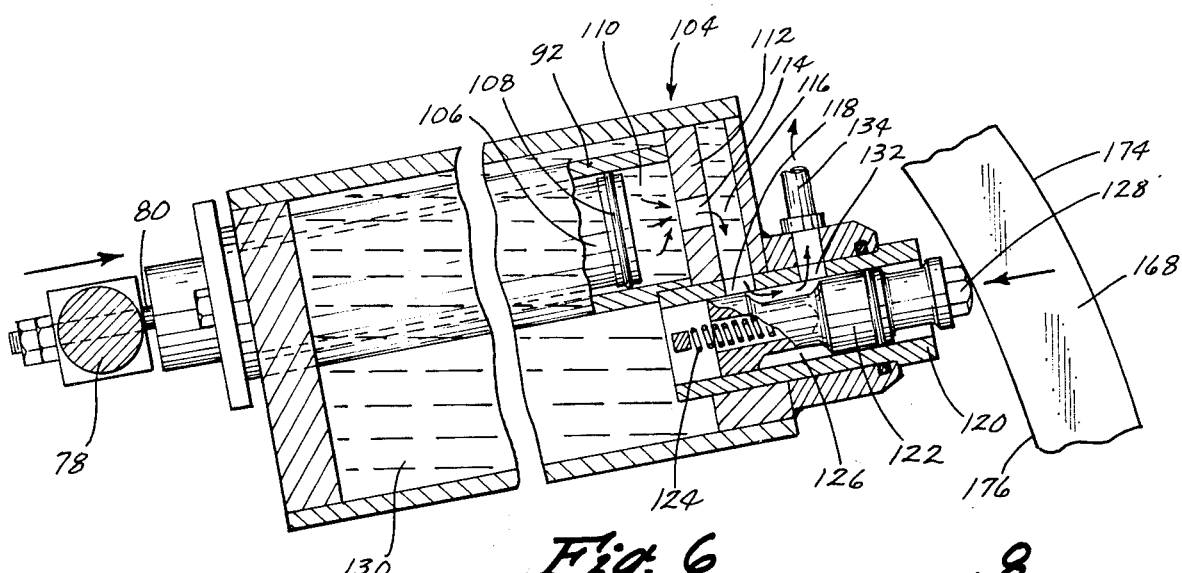
FIG. 6 is a partial sectional view of the displacement pump assembly.
Figure 7:
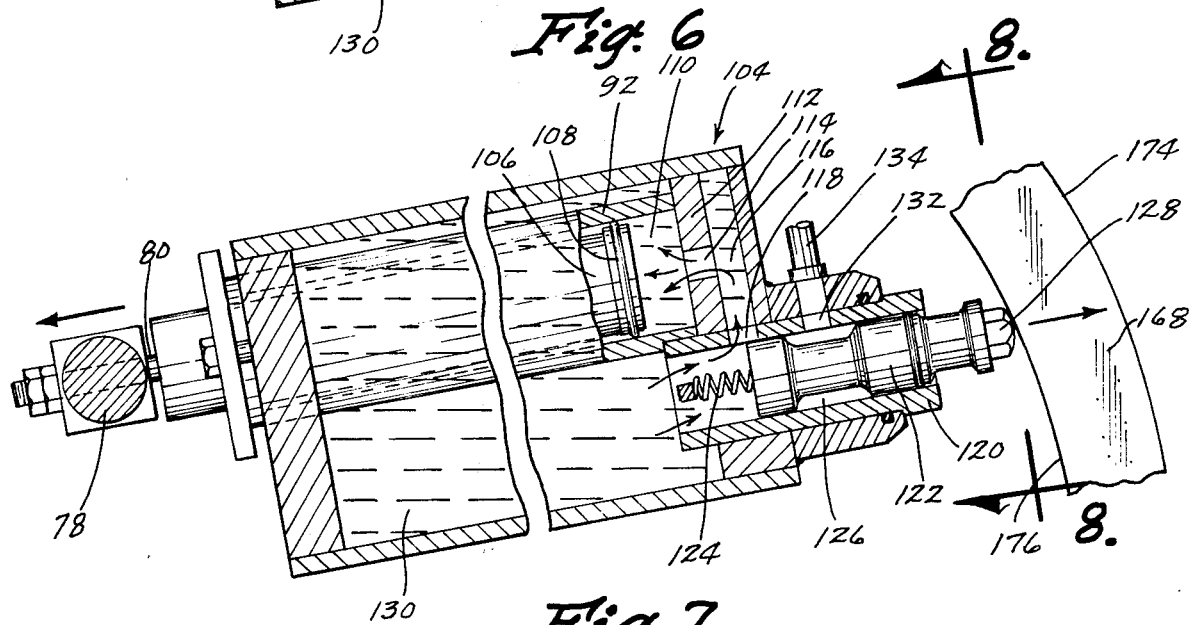
FIG. 7 is a view similar to that of FIG. 6 except that the control valve is closed.
Figure 8:
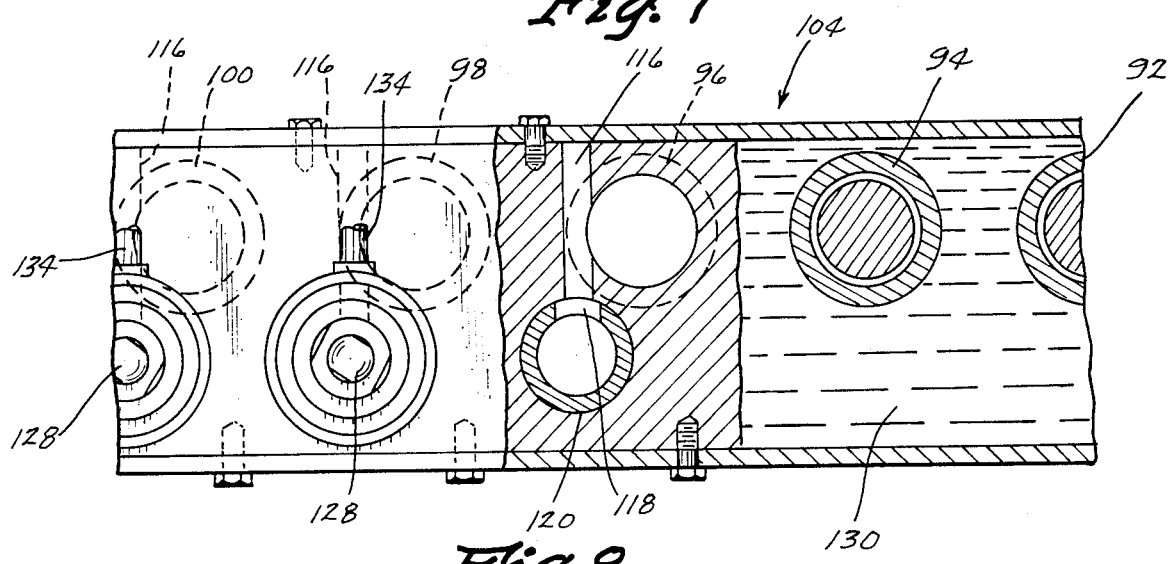
FIG. 8 is a sectional view as seen on lines 8—8 of FIG. 7.
Figure 9:
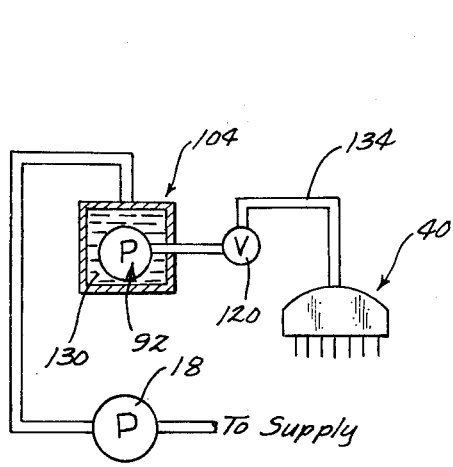
FIG. 9 is a schematic of the fluid circuitry.
Figure 10:
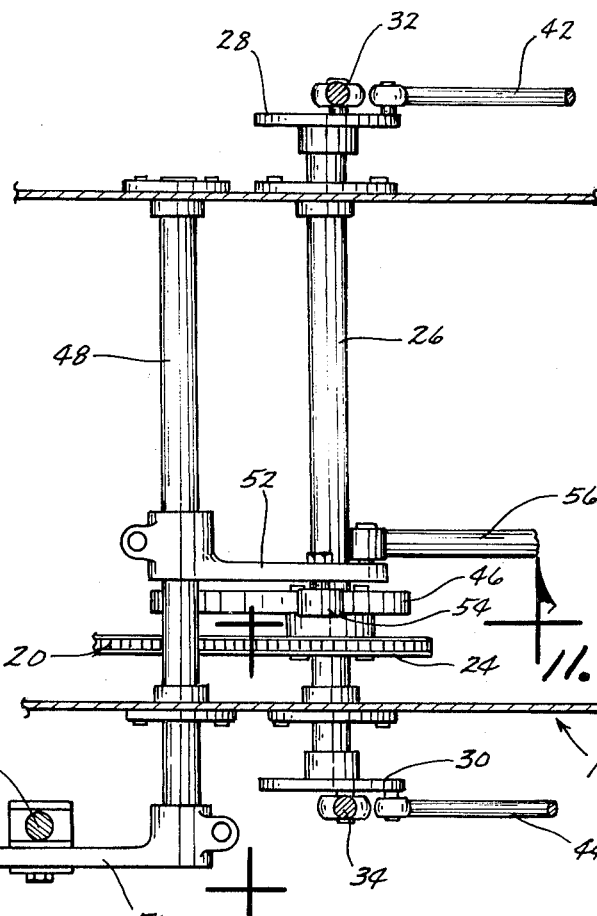
FIG. 10 is an enlarged sectional view seen on lines 10—10 of FIG. 1.

Rod 58 is pivotally connected at its lower end to crank arm 50 and extends upwardly therefrom as seen in the drawings. As illustrated in FIGS. 1 and 11, crank arm 50 is provided with an elongated slot 60 which adjustably receives the rod 58 to permit the "throw" of rod 58 to be varied. The upper end of rod 58 is connected to a bell crank apparatus referred to generally by the reference numeral 62. Bell crank apparatus 62 includes a triangular-shaped plate 64 having the upper end of the rod 58 pivotally connected thereto at 66. Plate 64 is rigidly connected to shaft 68 at 70 so that pivotal movement of the plate 64 will cause the shaft 68 to be rotated. Shaft 68 is operatively rotatably mounted on the machine at its opposite ends as illustrated in FIG. 12. Bracket 72 is rigidly secured to shaft 68 and extends downwardly therefrom and has rod 74 pivotally connected thereto which extends substantially horizontally therefrom. Rod 76 is pivotally connected at one end of the plate 64 and extends substantially horizontally therefrom parallel to rod 74. Shaft 78 is secured to and extends between the rods 74 and 76 and has pump rods 80, 82, 84, 86, 88 and 90 secured thereto and extending therefrom. Pump rods 80, 82, 84, 86, 88 and 90 extend from displacement pumps 92, 94, 96, 98, 100 and 102 respectively. Inasmuch as each of the displacement pumps are identical, only one displacement pump and its associated hardware will be described in detail. FIGS. 6, 7 and 8 illustrate the typical displacement pump apparatus. As seen in the drawings, displacement pump 92 is mounted within a displacement pump frame means referred to generally by the reference numeral 104. Displacement pump 92 includes a piston 106 which is connected to the rod 80 for movement therewith. As seen in FIG. 6, piston 106 is provided with a seal 108 on the inner end thereof which sealably engages the interior wall surface of the pump 92. For purposes of description, the interior compartment of the pump 92 will be referred to by the reference numeral 110. Pump 92 includes an inner wall member 112 having a port 114 formed therein. Port 114 is in communication with a bore 116 which extends downwardly and which is in communication with a port 118 formed in a valve housing 120. Valve 122 is movably mounted in housing 120 and has a spring 124 associated therewith which urges the valve 122 from the position of FIG. 6 to the position of FIG. 7. Valve 122 is provided with annular spool portion 126 formed therein intermediate the ends thereof. Valve 122 is provided with an outer end portion 128. The inner end of valve housing 120 is in communication with a fluid reservoir or chamber 130 which is in communication with a source of injector fluid under pressure. Valve housing 120 has a discharge port 132 formed therein which is in communication with conduit 134 extending therefrom.

Fluid manifold means 40 comprises six individual fluid manifolds designated by the reference numerals 136, 138, 140, 142, 144 and 146. Inasmuch as each of the fluid manifolds and the supporting structure therefor are identical, only fluid manifold 146 and the associated hardware will be described in detail. Each of the fluid manifolds move upwardly and downwardly as a unit due to the mounting thereof on the arms 36 and 38. Each of the fluid manifolds is provided with a plurality of injector needles 150 extending therefrom which are adapted to pierce the meat product or the like referred to generally by the reference numeral 152. As seen in FIG. 4, each of the injector needles 150 is slidably mounted in bores which are in communication with the conduit 134. Each of the fluid manifolds has a stripper plate 154 movably mounted thereon and associated therewith as illustrated in FIGS. 3 and 4. The stripper plate 154 is provided with a plurality of openings formed therein through which extend the injector needles 150. Stripper plate 154 includes an upwardly extending portion 156 having a rod 158 secured to the upper end thereof and which extends inwardly into a cylinder 160. As seen in FIG. 5, rod 158 has a piston 162 provided at its upper end which engages the inner wall surface of the cylinder 160. Cylinder 160 is secured to support 164 by bolts 166. Support 164 is rigidly secured to the fluid manifold for movement therewith. Valve actuator arm 168 is pivotally connected at its lower end to stripper plate 154 at 170 and extends upwardly and laterally therefrom as viewed in FIG. 4. Roller 172 is rotatably mounted on support 164 and is in engagement with the surface 174 of actuator 168. As illustrated in FIG. 4, surface 176 of actuator 168 engages one of the valves associated with the displacement pumps. Roller 172 is adapted to be seated in notch 172A in actuator 168 (See FIG. 1) at which time no fluid will flow through valve 122.

When it is desired to inject a meat product or the like such as a belly 152, the belly 152 is placed on the conveyor means 12 with the motor 14 being actuated. Actuation of the motor 14 causes pump 18 to be operated so that injector fluid is supplied to chamber 130. Actuation of the motor 14 also causes shaft 26 to be rotated which causes fluid manifold means 40 to be reciprocated upwardly and downwardly. Rotation of shaft 26 also causes the rods 42 and 44 to be reciprocated so that the conveyor means is operated to move the meat product from one end thereof to the other beneath the reciprocating fluid manifold means. Assuming that the fluid manifold means 40 is in its upper position, the position of the cam 46 relative to crank arm 52 is such that rod 58 is in its uppermost position to cause the rods 80, 82, 84, 86, 88 and 90 to be withdrawn from the cylinders of the displacement pumps. With the rod being withdrawn, fluid will pass from compartment 130, through the inner end of valve housing 120, upwardly through bore 116, through port 114 and into compartment 110. Such replenishment of the fluid to the compartment 110 is possible since spring 124 urges valve 122 to the right and since the fluid manifold means 40 is in its uppermost position, actuator 168 will not be sufficiently engaging the outer end of the valve to urge the same inwardly.

As the fluid manifold means 40 moves downwardly, each of the stripper plates moves downwardly with its associated fluid manifold due to the resistance offered by the piston 162 in the cylinder 160. When the stripper plate portion 154 engages the upper surface of the meat product 152, the stripper plate portion 154 halts its downward travel but the fluid manifold continues to travel downwardly or overtravel. As the fluid manifold overtravels the stripper plate, roller 172 on the fluid manifold causes the actuator 168 to be pivotally moved counterclockwise as viewed in FIG. 4 which causes the valve 122 to be moved inwardly in its housing 120 so that fluid may pass from compartment 110, through opening 114, bore 116, opening 118, opening 132 into conduit 134 due to the position of the valve 122 as seen in FIG. 6. If nothing more was done at this time, fluid would not be supplied to the fluid manifold since there is no pressure within compartment 110 until the displacement pump is moved to the right as viewed in FIG. 6. The movement of the displacement pump is controlled by the cam 46 as previously described to coordinate the movement of the displacement pumps in relation to the movement of the fluid manifold or crank action thereof. Thus, when cam 46 causes the rods of the displacement pumps to be moved inwardly, the displacement pump displaces a predetermined volume of injection fluid to the fluid manifold and the amount of fluid supplied to the fluid manifold is dependent upon the amount of fluid permitted to bypass the valve 122. It can be appreciated that if an extremely thick belly is sensed by the stripper plate, the roller 172 will pivot the actuator 168 much sooner during the downward travel of the fluid manifold so that an additional amount of injector fluid will be supplied to the fluid manifold. The roller 172 normally nests in notch 172A until the needles enter the meat product, and upon the retraction from the meat product so that fluid flow is cut off when the needles are not penetrating the meat product.

By providing a plurality of the stripper plates and displacement pumps, it is possible to sense the thickness of the meat product in a much more accurate manner such as illustrated in FIG. 3.

For purposes herein, the downward stroke of the needles will be referred to as the penetration stroke, and the upward stroke of the needles as the withdrawal stroke. The needles are actually penetrating the meat product only during the lower portion of both the penetration and withdrawal strokes. The velocity of the needles is greatest midway through each stroke and is instantaneously at zero velocity at the end of each stroke.

The cam 46 makes it possible to provide fluid through the needles both during the penetration and withdrawal strokes. The use of a crank arm instead of a cam would permit fluid to flow during only one stroke but not the other. As indicated heretofore, means are provided to cause fluid to flow through the needles only when the needles are within the meat product. However, the important phenomenon of the cam 46 and the ability of the pump to provide fluid through the needles at a rate proportional to the speed of the needles is still viable even if fluid were permitted to flow throughout the entire period of the penetration and withdrawal strokes, rather than just during the period that the needles are within the meat product.

Thus it can be seen that a machine has been provided wherein injection fluid is supplied to the meat product wherein a stripper bar assembly senses the thickness of the belly and such sensing is employed as the means to control the volume, rather than a time telement, output of the pump. By employing a simple displacement pump whose stroke is timed with the stroke of the injector, it is possible to control the displacement per injection. Such a method provides a much better and simpler means of accurately controlling the amount of injection desired. Thus it can be seen that the machine accomplishes at least all of its stated objectives.

I claim:

1. The method of injecting fluid into a meat product or the like, by means of a fluid pump fluidly connected to a fluid manifold which is fluidly connected to a plurality of needles adapted to be intermittently inserted into and withdrawn from said meat product, comprising, inserting said needles into said meat product and withdrawing said needles from said meat product in penetration and retraction strokes, respectively, varying the velocity of inserting and withdrawing of said needles with respect to said meat product during said penetration and retraction strokes, and supplying fluid to said meat product from said fluid pump through said manifold and said needles substantially continuously while said needles are within said meat product at a rate proportional to the velocity of said needles with respect to said meat product, whereby the rate of flow of fluid into said meat product is greater at the higher velocities of the needles, and is less at the lower velocities of said needles.

2. The method of claim 1 wherein said penetration stroke begins when said needles are not yet inserted into said meat product, and said retraction stroke ends after said needles are withdrawn from said meat product, and the velocity of said needles is greatest during the middle portion of said penetration and retraction strokes.

3. The method of claim 1 wherein fluid is supplied through said needles substantially only during the time that said needles are in said meat product.

4. A machine for injecting fluids into meat products and the like, comprising,
a support means adapted to support a meat product to be injected,
a fluid manifold movably mounted to and extending above said support means and being movable between upper and lower positions with respect to said support means,
a plurality of injecting needles extending downwardly from said fluid manifold and being adapted to pierce the meat product thereunder when said fluid manifold is moving towards its said lower position,
a pump in fluid communication with a source of injection fluid and in fluid communication with said fluid manifold,
power means on said support means for moving said fluid manifold between its upper and lower positions; for actuating said pump; and to vary the velocity of insertion into and withdrawal of said needles with respect to said meats,
and control means operatively connecting said pump and said fluid manifold to supply fluid to said meat product from said pump through said fluid manifold and needles substantially continuously while said needles are inserted into said meat product at a rate proportional to the velocity of said needles with respect to said meat product whereby the rate of flow of fluid into said meat product is greater at the higher velocities of said needles, and is less at the lower velocities of said needles.

5. The machine of claim 4 wherein said control means includes a meat product sensing means secured to said fluid manifold and being adapted to sense the thickness of said meat product; a valve means on said displacement pump; and a cam on said fluid manifold and in operative engagement with said valve means to control the flow of fluid from said pump to said meat product.

6. The machine of claim 4 wherein said control means includes additional means to provide flow of fluid through said needles only while said needles are inserted into said meat product.

7. The machine of claim 4 wherein said pump is a piston-type displacement pump.

8. The machine of claim 4 wherein a meat product sensing means is operatively connected to said fluid manifold for movement therewith during at least the initial portion of the downward travel of said fluid manifold means, said fluid manifold continuing to move downwardly relative to said sensing means to overtravel said sensing means after said sensing means has sensed the meat product,
valve actuator means operatively connected to said sensing means, said valve actuator means being moved to an actuator position during said overtravel,
conduit means fluidly connecting the discharge side of said pump and said fluid manifold,
a valve means in said conduit means,
said valve actuator means adapted to open said valve means during said overtravel so that injection fluid from said pump may be supplied to said needles.

9. The machine of claim 8 wherein said valve actuator means comprises an elongated arm means pivotally connected at one end thereof to said sensing means, said fluid manifold having means thereon which engages said elongated arm means to pivotally move the same to a first position during said overtravel, said valve means being engaged by said elongated arm when said elongated arm is in its said first position to open said valve means.

10. The machine of claim 9 wherein said elongated arm means has an arcuate cam surface thereon, said fluid manifold having a roller means mounted thereon which engages said cam surface.

11. The machine of claim 9 wherein said means on said fluid manifold which engages said elongated arm means is a roller element.

12. The machine of claim 9 wherein a notch opening is located on said arm means and is adapted to receive said roller element when said valve means in said conduit means is closed.

13. The machine of claim 4 wherein said fluid manifold comprises a plurality of fluid manifolds extending transversely with respect to said support means, said pump comprising a plurality of displacement pumps, each of said displacement pumps being in operative fluid communication with one of said fluid manifolds.

14. A machine for injecting fluids into meat products and the like, comprising,
a support means adapted to support a meat product to be injected,
a fluid manifold means movably mounted to and extending above said support means and being movable between upper and lower positions with respect to said support means,
a plurality of injecting needles extending downwardly from said fluid manifold means and being adapted to pierce the meat product thereunder when said fluid manifold is moving towards its said lower position,
a pump in fluid communication with a source of injection fluid and in fluid communication with said fluid manifold means,
power means on said support means for moving said fluid manifold means between its upper and lower positions; for actuating said pump; and to vary the velocity of insertion into and withdrawal of said needles with respect to said meats,
control means operatively connecting said pump and said fluid manifold means to supply fluid to said meat product from said pump through said fluid manifold means and needles at a rate proportional to the velocity of said needles with respect to said meat product whereby the rate of flow of fluid into said meat product is greater at the higher velocities of said needles, and is less at the lower velocities of said needles,
a meat product sensing means operatively connected to said fluid manifold means for movement therewith during at least the initial portion of the downward travel of said fluid manifold means, said fluid manifold means continuing to move downwardly relative to said sensing means to overtravel said sensing means after said sensing means has sensed the meat product, valve actuator means operatively connected to said sensing means, said valve actuator means being moved to an actuator position during said overtravel, conduit means fluidly connecting the discharge side of said pump and said fluid manifold means, a valve means in said conduit means, said valve actuator means adapted to open said valve means during said over travel so that injection fluid from said pump may be supplied to said needles, said fluid manifold means being a plurality of fluid manifolds extending transversely with respect to said support means, said pump comprising a plurality of displacement pumps, each of said displacement pumps being in operative fluid communication with one of said fluid manifolds, said valve means comprising a plurality of valves, each of said valves being in fluid communication with the conduit means connecting one of said displacement pumps with one of said fluid manifolds, said sensing means comprising a plurality of stripper plate assemblies, and said valve actuator means comprising a valve actuator mounted on each of said stripper plate assemblies for cooperation with one of said valves.

15. A machine for injecting fluids into meat products and the like comprising, a support means adapted to support a meat product to be injected, a fluid manifold means movably mounted to and extending above said support means and being movable between upper and lower positions with respect to said support means, a plurality of injecting needles extending downwardly from said fluid manifold means and being adapted to pierce the meat product thereunder when said fluid manifold is moving towards its said lower position, a pump in fluid communication with a source of injection fluid and in fluid communication with said fluid manifold means, power means on said support means for moving said fluid manifold means between its upper and lower positions; for actuating said pump; and to vary the velocity of insertion into and withdrawal of said needles with respect to said meats, control means operatively connecting said pump and said fluid manifold means to supply fluid to said meat product from said pump through said fluid manifold means and needles at a rate proportional to the velocity of said needles with respect to said meat product whereby the rate of flow of fluid into said meat product is greater at the higher velocities of said needles, and is less at the lower velocities of said needles, a meat product sensing means operatively connected to said fluid manifold means for movement therewith during at least the initial portion of the downward travel of said fluid manifold means, said fluid manifold means continuing to move downwardly relative to said sensing means to overtravel said sensing means after said sensing means has sensed the meat product, valve actuator means operatively connected to said sensing means, said valve actuator means being moved to an actuator position during said overtravel, conduit means fluidly connecting the discharge side of said pump and said fluid manifold means, a valve means in said conduit means, said valve actuator means adapted to open said valve means during said overtravel so that injection fluid from said pump may be supplied to said needles, said support means including a rotatable shaft mounted thereon which is rotated by said first power means, said shaft having a reciprocating arm means operatively connected thereto for reciprocating said fluid manifold means, a cam wheel means mounted in said shaft for rotation therewith, a pivotal arm means having means thereon in engagement with said cam wheel means so that said pivotal arm means will be reciprocatably pivoted as said cam wheel means rotates, said pump comprising a cylinder means having a piston means mounted thereon with a piston rod means connected to said piston and extending from said cylinder, and linkage means operatively connecting said pivotal arm means with said piston rod means so that said piston means will be displaced to coincide with the vertical displacement of said fluid manifold means.

16. The machine of claim 15 wherein said linkage means comprises a bell crank apparatus.

17. The machine of claim 14 wherein said support means includes a rotatable shaft mounted thereon which is rotated by said first power means, said shaft having a reciprocating arm means operatively connected thereto for reciprocating said fluid manifold means, a cam wheel means mounted on said shaft for rotation therewith, a pivotal arm means having means thereon in engagement with said cam wheel means so that said pivotal arm means will be reciprocatably pivoted as said cam wheel means rotates, each of said displacement pumps comprising a cylinder means having a piston means mounted thereon with a piston rod means connected to said piston and extending from said cylinder, and linkage means operatively connecting said pivotal arm means with said piston rod means whereby said piston means will be displaced to coincide with the vertical displacement of said fluid manifold means.

18. A machine for injecting fluids into meat products and the like, comprising, a support means adapted to support a meat product to be injected.

a fluid manifold movably mounted to and extending above said support means and being movable between upper and lower positions with respect to said support means, a plurality of injecting needles extending downwardly from said fluid manifold and being adapted to pierce the meat product thereunder when said fluid manifold is moving toward its said lower position, a pump in fluid communication with a source of injection fluid and in fluid communication with said fluid manifold, power means on said support means for moving said fluid manifold between its upper and lower positions; for actuating said pump; and to vary the velocity of insertion into and withdrawal of said needles with respect to said meats, control means operatively connecting said pump and said fluid manifold to supply fluid to said meat product from said pump through said fluid manifold and needles at a rate proportional to the velocity of said needles with respect to said meat product whereby the rate of flow of fluid into said meat product is greater at the higher velocities of said needles, and is less at the lower velocities of said needles, said support means includes a rotatable shaft mounted thereon, said shaft being operatively connected to said power means for rotation thereby, said shaft having a reciprocating arm means operatively connected thereto for reciprocating said fluid manifold, a cam wheel means mounted on said shaft for rotation therewith, a pivotal arm means operatively connected to said cam wheel means whereby said pivotal arm means will be reciprocatably pivoted as said cam wheel means rotates, said pump comprising a cylinder means having a piston means mounted thereon with a piston rod means connected to said piston and extending from said cylinder, and linkage means operatively connecting said pivotal arm means with said piston rod means whereby said piston means will be displaced to coincide with the vertical displacement of said fluid manifold.

* * * * *